P. H. VANDER WEYDE.
MAKING AND USING NITROUS OXID GAS.
No. 62,094. Patented Feb. 12, 1867.
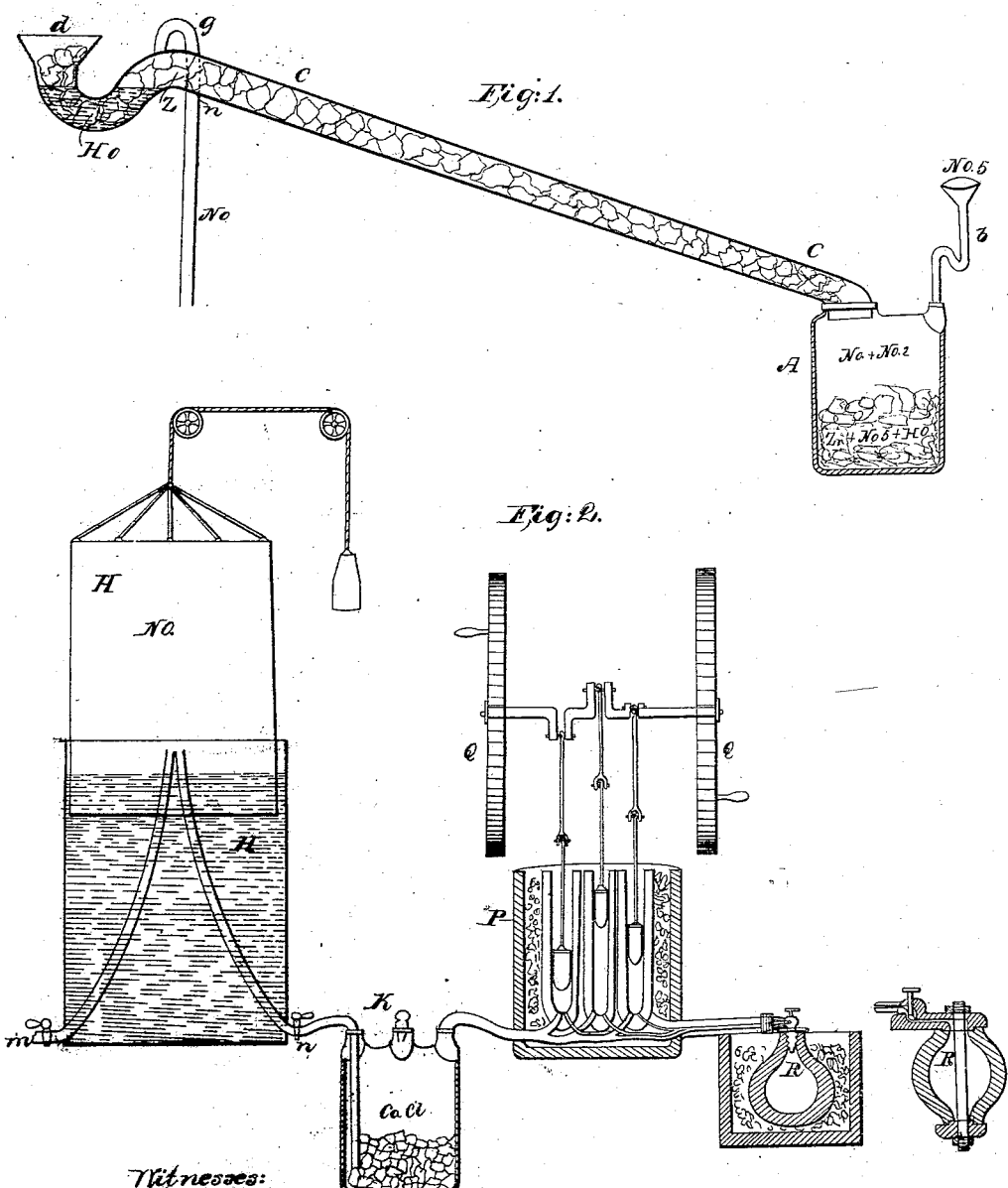

United States Patent Office.

P. H. VANDER WEYDE, M. D., OF PHILADELPHIA, PENNSYLVANIA.

Letters Patent No. 62,994, dated February 12, 1867; antedated January 30, 1867

IMPROVEMENT IN MAKING AND USING NITROUS OXIDE GAS.

The Schedule referred to in these Letters Patent and making part of the same.

Be it known that I, P. H. VANDER WEYDE, M. D., of Philadelphia, State of Pennsylvania, have invented new and improved Method of Making and Using Nitrous Oxide for the following purposes:

1. For anæstatic use during surgical operations.
2. As a powerful anti-spasmodic in case of cholera, typhoid or yellow fever, &c.
3. For the Drummond or calcium light, as a substitute for oxygen in magic lanterns, light-houses, &c.
4. For the hydro-oxygen blow-pipe, to melt platinum, &c.
5. As a compact substitute for the bulky oxygen, (which cannot be liquefied or much condensed,) in oxydizing processes.
6. As a disinfectant, and substitute for ozone.
7. For bleaching, as an aid to chlorine.
8. As a conservator of force; by being compressed by a steam force-pump, it will give the power back with which it was compressed, at any time, by its expansive capacity, acting like an enormous spring wound up.

The nature of my invention consists chiefly in the practical application, on a large scale, of the property discovered by modern chemistry, that nitrous oxide gas may be condensed to the liquid state at a temperature of 32° F., and a pressure of thirty-two atmospheres. This remarkable property was thus far only known as a scientific curiosity, and no particular use whatever has been made thereof. It has lately also been proved that nitrous oxide is the best anæstatic known, possessing none of the injurious effects and dangers to life connected with ether and chloroform, being itself a supporter of combustion and of life, whereas ether and chloroform are combustible bodies, non-supporters of combustion, and consequently extinguishers of life, or suffocators. It has also been proved that nitrous oxide is a powerful agent to break up spasms in typhoid fevers, and other diseases, and probably will be one of the best remedial agents during the first attack of cholera. The only reason that its use has not at once become universal is, the trouble of preparing, the enormous space it occupies, (six to eight gallons for a full dose,) and the impossibility of keeping it a long time. These grave objections I overcome by condensing eight hundred gallons in the space of a single gallon, by liquefying it under pressure. As it can be kept in this way for any length of time, it may be prepared on a large scale, and sent by express to any part of the country, carried on shipboard, &c., a jar of one gallon being sufficient for one hundred to two hundred full doses, and may benefit two hundred to four hundred patients. The great cold produced by the expansion of the liquid is a perfect protection against explosions. By its change from the liquid to the gaseous form it absorbs so much heat, (which is made latent in the escaping gas,) that its temperature, as well as the temperature of the remaining liquid, is so enormously reduced that its further evaporation is powerfully checked, and takes place surprisingly slow. It has also been found that this gas is as powerful a supporter of combustion as pure oxygen. This is explained by the fact that the oxygen in this gas is not in a somewhat neutral state, as it is in pure oxygen, but in a more active condition, like it is in ozone. Being combined already with a body of weak chemical affinities, it has stronger tendencies to enter into a new combination, after a universal, well-established chemical law. This causes, that notwithstanding it contains only one-third of its volume of pure oxygen, its affinities, (that is, its powers of combination,) are equally strong, and in many instances stronger than those of pure oxygen itself. In ozone, which is a very unstable compound of hydrogen with five atoms of oxygen, $HO_5$ (as made highly probable by Bunsen,) the greater part of the oxygen is in the same active condition, the compound $HO_5$ is reduced to $HO$ and $O_4$, that is, water, vapor, and oxygen, which, in its nascent state, much more readily enters in new combinations than pure oxygen; and by this action the ozone becomes one of the powerful scavengers of nature. In the same way, when a burning body is plunged in an atmosphere of nitrous oxide, the oxygen, in leaving its combination with the nitrogen, is in the same nascent state as in ozone, and enters more readily in new combinations than pure uncombined oxygen. Therefore, nitrous oxide is not only as good a supporter of combustion as pure oxygen, but as well a disinfectant as ozone. Those who suppose that ozone is an allotropic, or a more electro-positive condition of oxygen, may explain the fact of its disinfecting properties in their own way. As nitrous oxide has a sweet taste and agreeable odor, it is an excellent remedy after the use of the cheaper chlorine and the powerful bromine, of which, by the way, the price is higher than that of the liquid nitrous oxide. In using oxygen for Drummond or calcium lights, we meet with the same trouble of preparation, bulk of the gas in keeping, and difficulty of preserving. The best mode at present in use is to condense the gas in large cylinders at a pressure of twenty or thirty atmospheres, but as this gas cannot be liquefied, there is a limit to its condensation, the pressure increasing with the amount compressed in a ratio approximately expressed by the law of Mariotte. The nitrous oxide gas, however, being liquefiable, as soon as we have reached the point of liquefaction a further increase of pressure becomes impossible, all pressure above thirty-two atmospheres simply liquefying the excess of gas, the expansive force of the liquid never reaching above that point when kept at a temperature of 32° F., and averaging to about forty-five to fifty atmospheres in the summer heat. We have thus here a substitute for oxygen gas in the liquid form, which, by simply opening a stop-cock, will give, from a one-gallon jar, the quantity of eight hundred gallons gas, sufficient to sustain a Drummond or calcium light for the average time of forty-eight hours, longer or shorter, in proportion to the size of the jet used. When the gas evolving from this liquid is used for the hydrogen blow-pipe, for which it as good as pure oxygen, we see the curious phenomenon of producing the greatest heat at the jet, where we may melt platinum, and the greatest cold at the reservoir of the liquid gas, where we may freeze mercury, at the same time and by the same operation. In fact the evaporation of this liquid withdraws the heat from it, and from all bodies in contact with it; carries this heat latent in the gas to the jet, and sets this heat, with the electric heat of combustion, free at the place where it supports combustion. My theory is, that the heat and light from the sun are not stored up in the combustible substances, as coal and wood, during the growth, as now universally adopted, but that they are stored up in the oxygen, which is set free during active vegetation. The expansive force of the liquefied nitrous oxide gas may also be used as a store of power. It will expand like an enormous compressed spring, and the power of a few cylinders twenty feet long may drive a small railroad car in its tour through the city. To effect this, I propose to fill a set of globes, similar to the Harrison steam generator, with the liquefied gas, and place them under the seats in the car. At the depot is the steam engine to fill them; they are surrounded by ice, which will melt during the filling by the heat evolved during compression, but the water will freeze again by the cold produced by the expansion of the gas during the trip; so every car returning to the depot will have its cylinders surrounded by ice, and will be in proper condition to be filled again. The escaping gas need not be lost, but may be received in a bag on the top of the cars. I am aware that a similar plan has been proposed with carbonic acid gas, but the fact that this gas requires about double the pressure of the nitrous oxide to be liquefied, and that it freezes during its expansion, makes its use very objectionable. The only objection to my plan may be the expense of this gas, but I overcome this by an economical and easy method of preparation. Thus far this gas was only prepared by the destructive distillation of nitrate of ammonia. Almost half of it is converted into water, the other half in nitrous oxide. I dispense with this expensive salt altogether, and decompose commercial nitric acid $NO_5$ by zinc or iron, which deprives it of part of its oxygen, and changes $NO_5$ in $NO$ and $NO_2$.

To enable others to put my invention in practical operation, I will give here a full and detailed description thereof, reference being had to the accompanying drawing.

1. The economical way of making the gas on a large scale.

A, Figure 1, is a large Wolfe's bottle, with one narrow and one very wide neck. In the first is the safety-tube $b$, attached to introduce diluted nitric acid; in the other neck is the thick inclined tube $e$, attached to introduce scraps of zinc, and to give exit to the gas evolved. $t$ is a stop-cock, to draw off the exhausted acid. When diluted nitric acid, $NO_5$, acts on zinc, a mixture of nitrous and nitric oxide, $NO$ and $NO_2$, is evolved. These gases will ascend through the tube $c$, filled with scraps of zinc, which are slowly introduced at $d$, and finally fall in $a$, in the diluted nitric acid, and so supply this vessel. Moistened zinc has the property of decomposing nitric oxide, $NO_2$, by absorbing one atom of oxygen and converting it in nitrous oxide $NO$; therefore the zinc is introduced through water in the bend $e$, which water also serves to close the exit of the gas in $d$, and causes it to pass off through the tube $g$, from which it may be again passed over zinc, or, which is equally as good, over moist iron turnings or filings, to change its nitric oxide $NO_2$ more completely into nitrous oxide, $NO$. However, when we are to condense the gas, this precaution is not so essential, as the nitric oxide $NO_2$ cannot possibly be converted to a liquid; the condensation will, therefore, as it were, squeeze the nitric oxide out of the liquefying nitrous oxide.

2. The compression and liquefaction of the gas.

H, Figure 2, is a common gas reservoir, gasometer, which may have any form, (and may be a bag.) The gas is received at $m$, and has its exit at $n$, where it passes through the drying-bottle $k$, which is filled with chloride of calcium, or any other hygroscopic substance, as it is found very essential that the gas should be dry before compressing it. P is a press-pump, consisting of three narrow cylinders and pistons, driven by three cranks on the axis of one or two wheels, which cranks make with one another angles of one hundred and twenty degrees. In order to have no dead-point, but a continuous stream of gas, the pumps are placed in a box with ice in order to keep them cool, as a great heat is developed during compression. The fly-wheels Q may be turned by man-power, or better, by steam. R or R' is a globular vessel, to receive the liquid gas; it is also placed in ice. It is made of cast iron, secured by screws and bolts, and tested to withstand the pressure of one hundred atmospheres or fifteen hundred pounds to the square inch. These globular vessels are intended to be sent there where the gas is needed, the most convenient size for transportation being one or two gallons for medical use. For other various purposes the vessel may be proportionate to the requirements of the case.

What I claim as my invention, and wish to secure by Letters Patent, is—

1. The new economical method of making nitrous oxide gas, as above described.
2. The apparatus for compressing and liquefying it, as above described.
3. The use of the same liquefied gas, after its re-expansion, as an anæstatic for surgical operations, and anti-spasmodic in cases of typhoid fever, cholera, &c., and other medical operations.
4. The use, as a substitute for oxygen, for the Drummond or calcium light, or hydro-oxygen blow-pipe, for magic lanterns, light-houses, melting of platinum, &c.
5. Its use as a bleaching, oxidizing, deodorizing, and disinfecting agent.
6. Its use of the liquefied gas as a store of motive power for driving railroad cars and other contrivances.

In testimony whereof I have signed my name to this specification in the presence of two subscribing witnesses.

P. H. VANDER WEYDE.

Witnesses:
J. L. FLEURY,
LOUIS DE RONCERAY.